(12) United States Patent
Jennings (10) Patent No.: US 10,196,910 B2
(45) Date of Patent: *Feb. 5, 2019

(54) TURBINE VANE WITH LOAD SHIELD

(71) Applicant: Rolls-Royce Corporation, Indianapolis, IN (US)

(72) Inventor: Aaron P. Jennings, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 292 days.

This patent is subject to a terminal disclaimer.

(21) Appl. No.: 15/007,995

(22) Filed: Jan. 27, 2016

(65) Prior Publication Data

US 2016/0222806 A1 Aug. 4, 2016

Related U.S. Application Data

(60) Provisional application No. 62/109,686, filed on Jan. 30, 2015.

(51) Int. Cl.
| | |
|---|---|
| *F01D 5/14* | (2006.01) |
| *F01D 5/18* | (2006.01) |
| *F01D 5/28* | (2006.01) |
| *F01D 9/04* | (2006.01) |
| *F01D 9/06* | (2006.01) |

(52) U.S. Cl.
CPC .............. *F01D 9/065* (2013.01); *F01D 5/284* (2013.01); *F01D 9/041* (2013.01); *F01D 5/147* (2013.01); *F01D 5/186* (2013.01); *F01D 5/189* (2013.01); *F05D 2240/123* (2013.01); *F05D 2240/124* (2013.01); *F05D 2260/201* (2013.01); *F05D 2260/202* (2013.01); *F05D 2300/6033* (2013.01); *Y02T 50/672* (2013.01); *Y02T 50/676* (2013.01)

(58) Field of Classification Search
CPC .......... F01D 5/147; F01D 5/187; F01D 5/284; F01D 9/041; F01D 5/186; F01D 5/189; F01D 9/065; F05D 2240/123; F05D 2240/124; F05D 2300/6033; F05D 2260/201; F05D 2260/202

See application file for complete search history.

(56) References Cited

U.S. PATENT DOCUMENTS

| | | | | |
|---|---|---|---|---|
| 4,501,053 | A | * 2/1985 | Craig | ................. B23P 15/04 29/889.721 |
| 4,786,234 | A | * 11/1988 | Readnour | ............... F01D 5/147 415/115 |
| 5,090,866 | A | 2/1992 | Blair et al. | |
| 5,332,357 | A | * 7/1994 | Tubbs | ................. F01D 5/147 415/115 |
| 5,358,379 | A | 10/1994 | Pepperman et al. | |
| 5,630,700 | A | 5/1997 | Olsen et al. | |
| 6,200,092 | B1 | 3/2001 | Koschier | |

(Continued)

*Primary Examiner* — Logan Kraft
*Assistant Examiner* — Christopher R Legendre
(74) *Attorney, Agent, or Firm* — Barnes & Thornburg LLP (57) ABSTRACT

A turbine vane for use in a gas turbine engine is disclosed. The turbine vane includes an inner platform, an outer platform spaced from the inner platform, and an airfoil that extends from the inner platform to the outer platform. The airfoil includes a ceramic-containing web that forms a portion of the airfoil and a metallic load shield that forms another portion of the airfoil.

17 Claims, 2 Drawing Sheets

(56) References Cited

U.S. PATENT DOCUMENTS

| | | |
|---|---|---|
| 6,514,046 B1 | 2/2003 | Morrison et al. |
| 7,093,359 B2 | 8/2006 | Morrison et al. |
| 7,094,021 B2 | 8/2006 | Haubert |
| 7,316,539 B2 | 1/2008 | Campbell |
| 7,445,432 B2 * | 11/2008 | Levine .................... F01D 5/187 415/115 |
| 7,452,182 B2 | 11/2008 | Vance et al. |
| 7,607,287 B2 | 10/2009 | Reba et al. |
| 7,648,336 B2 | 1/2010 | Cairo |
| 7,837,438 B2 | 11/2010 | Campbell |
| 7,963,745 B1 | 6/2011 | Liang |
| 8,033,790 B2 | 10/2011 | Vance |
| 8,197,211 B1 | 6/2012 | Liang |
| 8,206,098 B2 | 6/2012 | Prill et al. |
| 8,292,580 B2 | 10/2012 | Schiavo et al. |
| 8,366,392 B1 * | 2/2013 | Liang ...................... F01D 5/147 416/96 A |
| 9,528,382 B2 * | 12/2016 | Morgan .................. F01D 5/147 |
| 2012/0301312 A1 | 11/2012 | Berczik et al. |
| 2013/0251536 A1 | 9/2013 | Mironets et al. |
| 2016/0222806 A1 * | 8/2016 | Jennings ................. F01D 9/065 |
| 2016/0222822 A1 * | 8/2016 | Jennings ................. F01D 5/284 |
| 2017/0254207 A1 * | 9/2017 | Schetzel ................. B23P 15/04 |

* cited by examiner

TURBINE VANE WITH LOAD SHIELD

CROSS REFERENCE TO RELATED APPLICATIONS

This application claims priority to and the benefit of U.S. Provisional Patent Application No. 62/109,686, filed 30 Jan. 2015, the disclosure of which is now expressly incorporated herein by reference.

FIELD OF THE DISCLOSURE

The present disclosure relates generally to vanes for gas turbine engines, and more specifically to vanes that comprise ceramic-containing materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A turbine vane for use in a gas turbine engine is disclosed in this paper. The turbine vane may include an inner platform, an outer platform spaced from the inner platform, and an airfoil that extends from the inner platform to the outer platform.

In illustrative embodiments, the airfoil may include a ceramic-containing web that forms a pressure side of the airfoil and a metallic load shield that forms a suction side of the airfoil. A cooling channel may be formed between the ceramic-containing web and the metallic load shield. The cooling channel may extend from a mid-span region of the airfoil toward the trailing edge of the airfoil.

In illustrative embodiments, the ceramic-containing web may be formed to include a first plenum that extends at least a portion of the distance from the inner platform to the outer platform. The first plenum may be in fluid communication with the cooling channel to provide a pathway for cooling air in the first plenum to be conducted to the cooling channel during use of the turbine vane in a gas turbine engine.

In illustrative embodiments, the ceramic-containing web may be formed to include a plurality of shield-cooling holes. The shield-cooling holes may provide fluid communication between the first plenum and the cooling channel.

In illustrative embodiments, the ceramic-containing web may be formed to include a second plenum that extends at least a portion of the distance from the inner platform to the outer platform. The second plenum may be spaced apart from the first plenum.

In illustrative embodiments, the ceramic-containing web may be formed to include a plurality of shield-cooling holes. The shield-cooling holes may provide fluid communication between the second plenum and the cooling channel.

In illustrative embodiments, the ceramic-containing web may be formed to include a plurality of web-cooling holes. The web-cooling holes may provide fluid communication out of the second plenum along the pressure side of the airfoil.

In illustrative embodiments, the ceramic-containing web may be formed to include at least one transfer aperture. The transfer aperture(s) may provide fluid communication between the first plenum and the second plenum.

In illustrative embodiments, the ceramic-containing web may be formed to include a plurality of web-cooling holes. The web-cooling holes may provide fluid communication out of the second plenum along the pressure side of the airfoil.

In illustrative embodiments, the turbine vane may comprise a restrictor plate. The restrictor plate may be arranged at an end of the first plenum and the second plenum. The restrictor plate may be formed to include a first restriction port in fluid communication with the first plenum and sized to cause a first pressure to be established within the first plenum by cooling air supplied to the first plenum that passes through the first restriction port. The restrictor plate may be formed to include a second restriction port in fluid communication with the second plenum and sized to cause a second pressure to be established within the second plenum by cooling air supplied to the second plenum that passes through the second restriction port.

In illustrative embodiments, the metallic load shield may form the trailing edge of the airfoil. The metallic load shield may be formed to include a plurality of discharge holes that provide fluid communication out of the cooling channel along the trailing edge of the airfoil.

According to another aspect of the present disclosure, a turbine vane may include an inner platform, an outer platform spaced from the inner platform, and an airfoil. The airfoil may extend from the inner platform to the outer platform.

In illustrative embodiments, the airfoil may include a ceramic-containing web that forms a pressure side of the airfoil and a metallic load shield that forms a suction side of the airfoil. The ceramic-containing web may be formed to include a first plenum that extends at least a portion of the distance from the inner platform to the outer platform. The metallic load shield may form a plurality of discharge holes along a trailing edge of the airfoil in fluid communication with the first plenum to allow egress of cooling air in the plenum along the trailing edge of the airfoil.

In illustrative embodiments, a cooling channel may be formed between ceramic-containing web and the metallic load shield. The cooling channel may provide fluid communication between the first plenum and the plurality of discharge holes.

In illustrative embodiments, the ceramic-containing web may be formed to include a plurality of shield-cooling holes. The shield-cooling holes may be arranged to direct cooling air in the first plenum toward the metallic load shield and to provide fluid communication between the first plenum and the cooling channel.

In illustrative embodiments, the ceramic-containing web may be formed to include a second plenum spaced apart from the first plenum. In some embodiments, the ceramic-containing web may be formed to include a plurality of web-cooling holes that provide fluid communication out of the second plenum along the pressure side of the airfoil.

In illustrative embodiments, the ceramic-containing web may be formed to include at least one transfer aperture. The transfer aperture(s) may provide fluid communication between the first plenum and the second plenum.

In illustrative embodiments, the ceramic-containing web may be formed to include a third plenum spaced apart from the first plenum. The third plenum may be in fluid communication with the cooling channel According to another aspect of the present disclosure, an airfoil for a gas turbine engine is taught. The airfoil may include a ceramic-containing web that forms a pressure side of the airfoil, and a metallic load shield that forms a suction side of the airfoil.

In illustrative embodiments, the metallic load shield may be arranged adjacent to the ceramic-containing web to form a cooling channel between the ceramic-containing web and the metallic load shield. The cooling channel may extend from a mid-span region of the airfoil toward the trailing edge of the airfoil.

In illustrative embodiments, the ceramic-containing web may be formed to include a first plenum. The first plenum may be in fluid communication with the cooling channel.

In illustrative embodiments, the metallic load shield may form a trailing edge of the airfoil. The metallic load shield may be formed to include a discharge hole that provides fluid communication out of the cooling channel along the trailing edge of the airfoil.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2, 3:
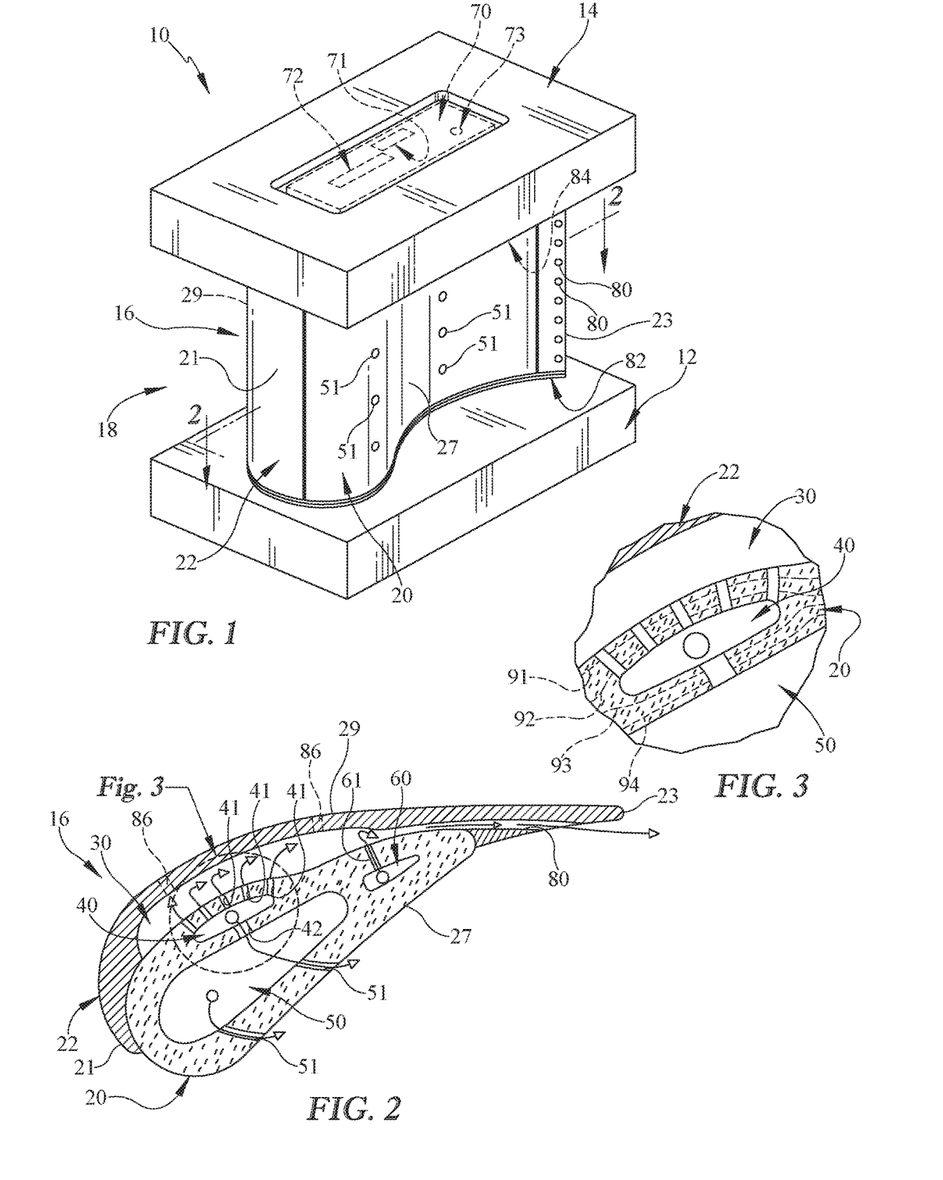
FIG. 1 is perspective view of a turbine vane adapted for use in a gas turbine engine showing that the turbine vane includes an inner platform, an outer platform, and an airfoil that extends from the inner platform to the outer platform.
FIG. 2 is a cross sectional view of the turbine vane of FIG. 1 taken at line 2-2 showing that the airfoil includes a ceramic-containing web that provides a pressure side of the airfoil and a metallic load shield that provides a suction side of the airfoil and showing that a cooling channel is formed between the ceramic-containing web and the metallic load shield to conduct cooling air through the airfoil.
FIG. 3 is a detail view of a portion of FIG. 2 showing that a plenum formed in the ceramic-containing web supplies cooling air to the cooling channel via a plurality of load shield cooling holes that extend from the plenum to the cooling channel.

An illustrative turbine vane assembly 10 for use in a gas turbine engine is shown in FIG. 1. The turbine vane 10, sometimes simply called a turbine vane 10, includes an inner platform 12, an outer platform 14, and an airfoil 16. The inner platform 12 and outer platform 14 are spaced apart in a radial direction from one another and cooperate to define a flow path 18 for hot high pressure gases moving through the turbine section of a gas turbine engine. The airfoil 16 extends in the radial direction from the inner platform 12 to the outer platform 14.

The airfoil 16 extends across the flow path 18 to interact with the hot gases moving through the flow path 18 and is shaped to redirect the hot gases before those gases act on rotating blades of the turbine section as suggested in FIG. 1. The airfoil 16 illustratively incorporates a ceramic-containing web 20, a metallic load shield 22, and cooling air passages 30, 40, 50, 60 to help withstand high temperatures of the gases as shown in FIGS. 1 and 2. The ceramic-containing web 20 comprises a high-temperature resistant material and illustratively forms a pressure side 27 of the airfoil 16 that directly redirects hot gases moving through the flow path 18. The exemplary metallic load shield 22 forms a suction side 29 of the airfoil 16.

The metallic load shield 22 illustratively provides means for supporting the ceramic-containing web 20 relative to the platforms 12, 14 (and/or a turbine case holding the turbine vane 10) when the ceramic-containing web 20 is acted upon by high-temperature gases as shown in FIGS. 1 and 2. Accordingly, the ceramic-containing web 20 is held in place during use of the turbine vane 10 without the requirement of being self-supporting.

The ceramic-containing web 20 and the metallic load shield 22 are arranged adjacent to one another and cooperate to form a cooling channel 30 adapted to conduct cooling air through the airfoil 16 as shown in FIG. 2. The cooling channel 30 illustratively extends through the airfoil 16 in the radial direction R and from a mid-span region 25 of the airfoil 16 (somewhere between a leading edge 21 and a trailing edge 23 of the airfoil 16) toward the trailing edge 23 of the airfoil 16.

The cooling channel 30 is illustratively fed cooling air from a diffuser plenum 40 formed in the ceramic-containing web 20 as shown in FIG. 2. The diffuser plenum 40 is fluidly coupled to the cooling channel 30 by shield-cooling holes 41 that direct cooling air along an interior side of the metallic load shield 22 that faces the cooling channel 30 so that the metallic load shield 22 is cooled during use of the turbine vane 10.

In the illustrative embodiment, the diffuser plenum 40 also provides cooling air to a web-cooling plenum 50 as shown in FIG. 2. The web-cooling plenum 50 bleeds air at various locations thorough bleed holes 51, 52 arranged along the pressure side 27 of the airfoil 16 to cool the ceramic web 20. The diffuser plenum 40 is fluidly coupled to the web-cooling plenum 50 by transfer apertures 42.

The exemplary cooling channel 30 is also fed by a supplemental plenum 60 formed in the ceramic-containing web 20 near the trailing edge of the ceramic-containing web 20 as shown in FIG. 2. The supplemental plenum 60 is fluidly coupled to the cooling channel 30 by shield-cooling holes 61 that direct cooling air along an interior side of the metallic load shield 22 that faces the cooling channel 30 so that the metallic load shield 22 is cooled during use of the turbine vane 10.

In the illustrative embodiment, the ceramic-containing web 20 is a composite component adapted to withstand very high operating temperatures that might not be possible for metallic components. More specifically, the ceramic-containing web 20 comprises a ceramic matrix composite (CMC). Even more particularly, the ceramic-containing web 20 is made from a SiC—SiC ceramic matrix composite including a silicon carbide matrix and silicon carbide fibers. For purposes of this application, a ceramic-containing material is any monolithic ceramic or composite in which at least one constituent is a ceramic.

Illustratively, the ceramic web 20 includes woven plies of reinforcement 91, 92, 93, 94 that wrap from the trailing edge around the leading edge of the web 20 as suggested in FIG. 2. The woven plies 91, 92, 93 are then suspended in a matrix material and processed into the final shape of the ceramic web 20. The plenums 40, 50, 60 are formed by the creation of gaps between the woven plies 91, 92, 93, 94 as shown, for example, in FIG. 3. In other embodiments, the woven plies of reinforcement 91, 92, 93, 94 may be tubes without any seam. In still other embodiments, the ceramic web 20 may be made from chopped reinforcing fibers suspended in a matrix or from a monolithic ceramic.

In the illustrative embodiment, the metallic load shield 22 forms the trailing edge 23 of the airfoil 16 as shown in FIGS. 1 and 2. The load shield 22 is formed to include a plurality of discharge holes 80 that provide fluid communication out of the cooling channel 30 along the trailing edge 23 of the airfoil 16. In other embodiments, the load shield 22 may be formed to include a trench or other apertures that provide fluid communication out of the cooling channel 30 near the trailing edge 23 of the airfoil 16.

In the illustrative embodiment, the metallic load shield 22 is coupled to the inner platform 12 and the outer platform 14 by bicast joints 82, 84 so that load applied to the metallic load shield 22 by the ceramic-containing web 20 is passed onto the platforms 12, 14 as shown in FIG. 1. In other embodiments, the metallic load shield 22 may be coupled to the platforms 12, 14 or other structural parts included in the turbine section of a gas turbine engine via bicasting, fasteners, welding, and/or other couplers. In some embodiments, the load shield 22 may be formed to include optional bleed holes 86 that discharge cooling air out of the cooling channel 30 along the suction side 29 of the airfoil 16.

The exemplary metallic load shield 22 comprises a high-temperature resistant superalloy adapted to withstand high operating temperatures. More specifically, the metallic load shield 22 shown in FIGS. 1-3 comprises a nickel-based or cobalt-based alloy. Specific examples of such superalloys include, but are not limited to, materials marketed under the trade names INCONEL® and WASPALOY®.

In some embodiments of the present disclosure, an optional restrictor plate 70 may be included in the vane 10 as shown in FIG. 1. The restrictor plate 70 may be arranged at an end of the plenums 40, 50, 60 and may be formed to include restriction ports 71, 72, 73 in fluid communication with the plenums 40, 50, 60. The restriction ports 71, 72, 73 may be sized to establish pressures within the plenums 40, 50, 60 by restricting the flow cooling air supplied to the plenums 40, 50, 60 after passing through the restriction ports 71, 72, 73.

The exemplary turbine vane assembly 10 is shown as a singlet, having one airfoil that extends between the inner platform 12 and the outer platform 14 as shown in FIG. 1. In some embodiments, a turbine vane assembly in accordance with the present disclosure may be a doublet or multi-airfoil segment, having two or more airfoils that extend between the inner platform and the outer platform. In some embodiments, a turbine vane assembly in accordance with the present disclosure may be a full ring, having an inner and/or outer platform that forms a full hoop with multiple airfoils arranged radially between the inner and outer platforms and spaced circumferentially around the full hoop(s). In some embodiments, the vane assembly 10 disclosed herein may be used in the compressor section of a gas turbine engine upon a design need for high temperature capability in the compressor.

In illustrative applications, the airfoil 16 disclosed herein may be also be incorporated into a turbine blade. In such applications, the outer platform 14 may be replaced by a blade tip and/or a blade shroud coupled to the airfoil 16. Further, a root and/or other attachment feature may be coupled to the airfoil 16 and/or the inner platform 12 to allow coupling of the airfoil 16 to a turbine disk for rotation therewith. It is also contemplated, in turbine blade applications, that the metallic load shield 22 may be integrally formed with a turbine disk to form part of a blisk assembly.

A cooled turbine vane according to the illustrated example in this disclosure is comprised of a metallic structure 22 and a CMC body 20. The metallic structure 22 is principally responsible for reacting the mechanical loads imparted by the gas path air while the CMC body 20 comprises the pressure side 27 of the airfoil feature for the purpose of reducing the amount of cooling required to provide adequate durability.

The illustrated design provides a hybrid vane that employs the CMC material to form one side of an otherwise fully metallic turbine vane airfoil. For a turbine vane, the airfoil surface typically requires the largest amount of cooling air within the component. Thus, to replace some portion of an otherwise fully metallic airfoil with a high temperature capable ceramic material could significantly reduce the total amount of cooling air required to meet component durability at higher inlet turbine gas temperatures. It would also be accurate to describe this concept as a CMC Vane with a metallic load shield as the metallic skin 22 is adapted to mitigate the load carrying limitations of the CMC material. This design concept is likely useful in high and moderate turbine operating temperature engine applications where at least one side of an otherwise fully metallic vane airfoil would require cooling.

This design features an integrally constructed or fabricated metallic structure comprising the inner and outer bands (or platforms) 12, 14 as well as the suction side 29 of the airfoil 16. The CMC component 20 is principally constructed In a representatively classic airfoil shape with opposing sides and forms the pressure side 27 of the airfoil 16, whereas the metal portion of the airfoil 16 is constructed as a metallic skin 22. The metallic skin 22 would be either rigidly bonded to or integrally formed with both the inner and outer endwall features (or platforms) 12, 14 to enable mechanical load transmission to the engine structure. Since the ultimate load carrying capability of CMCs can be low relative to metals, constructions where the CMC component has a larger total cross sectional area larger than the metal component may be desirable.

While the metallic skin 22 is rigidly attached to both the metallic inner and outer endwall features 12, 14, the CMC component 20 may be constrained otherwise so as to allow the elongated airfoil to thermally grow independently of the metallic skin 22 via sliding. It is conceived that the vane will be assembled by radially feeding the CMC body 20 into the metallic structure through either the outer or inner endwalls 12, 14.

In order to be used in high temperature environments, this design includes a cooling scheme. It is conceived that the metallic skin 22 would embody an impingement cavity that would be vented at the trailing edge 23 of the airfoil 16. In the attached graphic, cooling air is routed through a small dedicated cavity within the non-gaswashed wall of the CMC body 20 and then impinged upon the metallic skin 22 via holes through the CMC wall. It is conceived that the small dedicated cavity will require a separation of fiber sheets rending the wall thickness around this cavity to be less than throughout the remainder of the CMC body 20. This design may minimize the size of the highest-pressure cavity so as to potentially better manage mechanical stresses. Additional cooling features may be machined or cast into the metallic skin 22 to aid in heat transfer.

It is conceived that the embodiment of cooling features into the CMC component may drive significant thermal gradients and stresses. This may be favorable to mechanically driven stresses.

It is conceived that cooling air will be fed through the dedicated cavity within the CMC wall in a balanced way so as to provide adequate mass flow for cooling but not overpressure the CMC body to the point of a ballooning-style failure. A metering plate 70 may be employed to control mass-flows into the CMC body 20. A structural design requirement for the CMC body will be to withstand the pressure drop through-wall needed to drive impingement flows. It is conceived that this configuration may require pressurization within each cavity In order to minimize CMC mechanical stress. Since this design includes a cooling scheme, sealing considerations must be made and/or the design must be accommodative of predicted leakages.

It is conceived that since there will be a seam at both the leading and trailing edges where the CMC and metallic skin meet, it is possible that external leakage areas will manifest as long, thin, span-wise openings at those locations. It also Is conceived that the leading edge of the metallic skin should extend towards the pressure side of the hybrid airfoil at or beyond the stagnation point. As such leakages from the leading edge seam may create a film, biased towards mid-span, which might provide some heat shielding to the CMC pressure side.

Due to the geometric complexity and the fact that the cooling cavities are created through an interface between materials with differing coefficients of thermal expansion, it is possible that interfaces will need to be somewhat optimized to control leakages at key operating conditions. This could either be at a maximum turbine operating temperature condition or another condition where the engine might operate for a large portion of Its duty cycle. It is conceived that the flow metering features would be the holes through the CMC wall. Thus the cooling effectiveness may not be too sensitive to variability in leakage areas between the CMC and the metallic skin. Another approach to address this would be to simply upflow the cavity to compensate for the potential ineffectiveness.

It is conceived that that the air pressure within the cooling cavity will create a force that seeks to separate the CMC from metallic skin. Therefore, there will likely be a seam at both the leading and trailing edges, where the CMC and metallic skin meet, that will create elongated and span-wise leakage areas. Such leakages from the leading edge seam may create a film, biased towards mid-span, which might prove useful, or at the very least, may not be too costly from a turbine efficiency perspective as that leakage air has already been used to extract heat from the metal skin. If these leakage areas are predictable at peak operating temperatures they may serve as the primary venting features, otherwise dedicated venting features will be needed to control pressure margin and total cooling flow consumption.

Though the illustrative figures depict a curved interface between the CMC and the metallic skin, there is no absolute need for such a sophisticated interface. It could be more planar (or multi-planar) and otherwise simplistic in whatever fashion best balances produce-ability with cooling needs.

Figure 4:
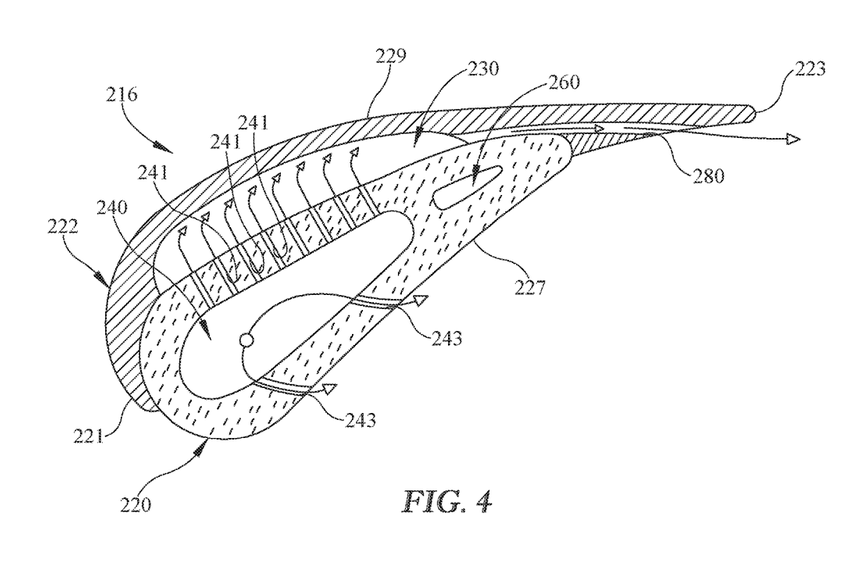
FIG. 4 is a cross sectional view of second turbine vane similar to the turbine vane of FIGS. 1-3.

Turning now to FIG. 4, a second illustrative airfoil 216 adapted for use in a vane or blade is shown. The airfoil 216 illustratively incorporates a ceramic-containing web 220, a metallic load shield 222, and cooling air passages 230, 240, 260 to help withstand high temperatures of gases interacting with the airfoil. The ceramic-containing web 220 comprises a high-temperature resistant material and illustratively forms a pressure side 227 of the airfoil 216. The metallic load shield 222 forms a suction side 229 of the airfoil 216.

The metallic load shield 222 illustratively provides means for supporting the ceramic-containing web 220 when the ceramic-containing web 220 is acted upon by high-temperature gases as shown in FIG. 4. Accordingly, the ceramic-containing web 220 is held in place during use of the airfoil 216 without the requirement of being self-supporting.

The ceramic-containing web 220 and the metallic load shield 222 are arranged adjacent to one another and cooperate to form a cooling channel 230 adapted to conduct cooling air through the airfoil 216 as shown in FIG. 4. The cooling channel 230 illustratively extends through the airfoil 216 from a mid-span region 225 of the airfoil 216 (somewhere between a leading edge 221 and a trailing edge 223 of the airfoil 216) toward the trailing edge 223 of the airfoil 216.

The cooling channel 230 is illustratively fed cooling air from a diffuser plenum 240 via holes 241 as shown in FIG. 4. The diffuser plenum 240 also bleeds air at various locations thorough bleed holes 243 arranged along the pressure side 227 of the airfoil 216 to cool the ceramic web 220.

A supplemental plenum 260 formed in the ceramic-containing web 220 near the trailing edge of the ceramic-containing web 220 as shown in FIG. 4. The supplemental plenum 260 carries cooling air through the ceramic web 220.

In the illustrative embodiment, the ceramic-containing web 220 is a composite component adapted to withstand very high operating temperatures that might not be possible for metallic components. More specifically, the ceramic-containing web 220 comprises a ceramic matrix composite (CMC). Even more particularly, the ceramic-containing web 220 is made from a SiC—SiC ceramic matrix composite including a silicon carbide matrix and silicon carbide fibers. For purposes of this application, a ceramic-containing material is any monolithic ceramic or composite in which at least one constituent is a ceramic.

Illustratively, the ceramic web 220 includes woven plies of reinforcement that wrap from the trailing edge around the leading edge of the web. The woven plies are then suspended in a matrix material and processed into the final shape of the ceramic web 220. The plenums 240, 260 are formed by the creation of gaps between the woven plies. In other embodiments, the woven plies of reinforcement may be tubes without any seam. In still other embodiments, the ceramic web 220 may be made from chopped reinforcing fibers suspended in a matrix or from a monolithic ceramic.

In the illustrative embodiment, the metallic load shield 222 forms the trailing edge 223 of the airfoil 216 as shown in FIG. 4. The load shield 222 is formed to include a plurality of discharge holes 280 that provide fluid communication out of the cooling channel 230 along the trailing edge 223 of the airfoil 216. In other embodiments, the load shield 222 may be formed to include a trench or other apertures that provide fluid communication out of the cooling channel 230 near the trailing edge 223 of the airfoil 216.

The exemplary metallic load shield 222 comprises a high-temperature resistant superalloy adapted to withstand high operating temperatures. More specifically, the metallic load shield 222 comprises a nickel-based or cobalt-based alloy. Specific examples of such superalloys include, but are not limited to, materials marketed under the trade names INCONEL® and WASPALOY®.

The cooled turbine vane 210 according to the illustrated example in this disclosure is comprised of a metallic structure 222 and a CMC body 220. The metallic structure is principally responsible for reacting the mechanical loads imparted by the gas path air while the CMC body comprises either the pressure side or the suction side of the airfoil feature for the purpose of reducing the amount of cooling required to provide adequate durability.

The hybrid vane 210 disclosed employs the CMC material to form one side of an otherwise fully metallic turbine vane airfoil. For a turbine vane, the airfoil surface typically requires the largest amount of cooling air within the component. Thus, to replace some portion of an otherwise fully metallic airfoil with a high temperature capable ceramic material could significantly reduce the total amount of cooling air required to meet component durability at higher inlet turbine gas temperatures. It would also be accurate to describe this concept as a CMC Vane with a metallic "load shield" as the metallic skin is intended to mitigate the load carrying limitations of the CMC material. This design may be useful in high and moderate turbine operating temperature engine applications where at least one side of an otherwise fully metallic vane airfoil would require cooling.

The illustrative design features an integrally constructed or fabricated metallic structure comprising the inner and outer bands as well as the suction side of the airfoil 216. The CMC component is principally constructed in a representatively classic airfoil shape with opposing sides and forms the pressure side of the airfoil 216, whereas the metal portion of the airfoil is constructed as a metallic skin 222. The metallic skin 222 would be either rigidly bonded to or integrally formed with both the inner and outer endwall features to enable mechanical load transmission to the engine structure. Since the ultimate load carrying capability of CMCs is low relative to metals, it may be desired to employ constructions where the CMC component has a larger total cross sectional area whereas the metal component would be the thinner skin-like component While the metallic skin 222 is rigidly attached to both the metallic inner and outer endwall features, the CMC component may be constrained otherwise so as to allow the elongated airfoil to thermally grow independently of the metallic skin via sliding. It is conceived that the vane will be assembled by radially feeding the CMC body 220 into the metallic structure through either the outer or inner enwalls.

In order to be used in high temperature environments, the exemplary design includes a cooling scheme. It is conceived that the metallic skin 222 would embody an impingement cavity that would be vented at the trailing edge of the airfoil. In the attached figures cooling air is routed through the center of the CMC body impinged upon the metallic suction sice via holes through the CMC wall. Additional cooling features may be machined or cast into the metallic skin to aid in heat transfer.

The illustrative hybrid vane 210 is shown in FIG. 4 wherein the CMC component 220 forms the pressure side of the airfoil 216 and the metallic skin 222 forms the suction side of the airfoil. It is conceived that cooling air will be fed through the center of the CMC body 220 in a balanced way so as to provide adequate mass flow for cooling but not overpressure the CMC body to the point of a ballooning style failure. A metering plate may be employed to control mass-flows into the CMC body. A structural challenge for the CMC body will be to withstand the pressure drop through the other wall needed to drive impingement flows. It is conceived that this configuration will be advantaged over the reverse configuration in that pressure differential across any CMC is as low as inherently possible, thereby controlling CMC mechanical stress.

It is conceived that since there will be a seam at both the leading and trailing edges where the CMC 220 and metallic skin 222 meet, it is most likely that external leakage areas will manifest as long, thin, span-wise openings at those locations. It also is conceived that the leading edge of the metallic skin 222 should extend towards the pressure side of the hybrid airfoil 216 at or beyond the stagnation point. As such leakages from the leading edge seam may create a film, biased towards mid-span, which might provide some heat shielding to the CMC pressure side.

Due to the geometric complexity and the fact that the cooling cavities are created through an interface between materials with differing coefficients of thermal expansion, it is likely that interfaces will need to be somewhat optimized to control leakages at key operating conditions. This could either be at a maximum turbine operating temperature condition or another condition where the engine might operate for a large portion of its duty cycle.

It is conceived that the flow metering features may be impingement holes through the CMC wall. Thus the cooling effectiveness may not be too sensitive to variability in leakage areas between the CMC and the metallic skin. Another approach to address this would be to simply upflow the cavity to compensate for the potential ineffectiveness It is conceived that that the air pressure within the cooling cavity will create a force that seeks to separate the CMC 220 from metallic skin 222. Therefore, there will likely be a seam at both the leading and trailing edges, where the CMC 220 and metallic skin 222 meet, that will create elongated and span-wise leakage areas. Such leakages from the leading edge seam may create a film, biased towards mid-span, which might prove useful, or at the very least, may not be too costly from a turbine efficiency perspective as that leakage air has already been used to extract heat from the metal skin. If these leakage areas are predictable at peak operating temperatures they may serve as the primary venting features, otherwise dedicated venting features will be needed to control pressure margin and total cooling flow consumption.

Though the attached figures depicts a curved interface between the CMC 220 and the metallic skin 222, there is no absolute need for such a sophisticated interface. It could be more planar (or multi-planar) and otherwise simplistic in whatever fashion best balances produce-ability with cooling needs.

Figure 5:
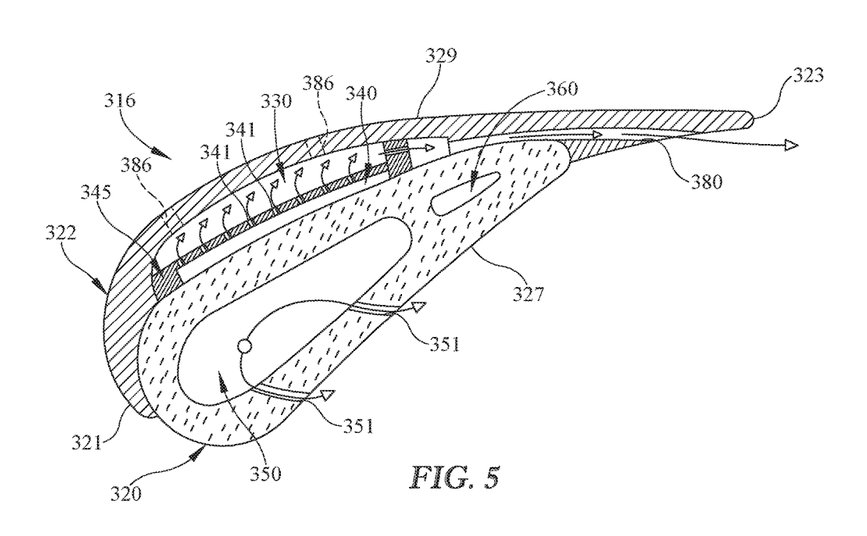
FIG. 5 is a cross sectional view of a third turbine vane similar to the turbine vane of FIGS. 1-3 and similar to the turbine vane of FIG. 4.

Turning finally to FIG. 5, a third illustrative airfoil 316 adapted for use in a vane or blade is shown. The airfoil 316 illustratively incorporates a ceramic-containing web 320, a metallic load shield 322, an impingement plate 345, and cooling air passages 330, 340, 350, 360 to help withstand high temperatures of gases interacting with the airfoil. The ceramic-containing web 320 comprises a high-temperature resistant material and illustratively forms a pressure side 327 of the airfoil 316. The metallic load shield 322 forms a suction side 329 of the airfoil 316.

The metallic load shield 322 illustratively provides means for supporting the ceramic-containing web 320 when the ceramic-containing web 320 is acted upon by high-temperature gases. Accordingly, the ceramic-containing web 320 is held in place during use of the airfoil 316 without requiring the web 320 to be self-supporting.

The impingement plate 345 is arranged between the ceramic-containing web 320 and the metallic load shield 322 as shown in FIG. 5. The impingement plate 345 forms a cooling channel 330 between the impingement plate 345 and the metallic load shield 322. The impingement plate 345 also forms a diffuser plenum 340 between the impingement plate 345 and the ceramic web 320.

The cooling channel 330 illustratively extends radially through the airfoil 316 and from a mid-span region 325 of the airfoil 316 toward the trailing edge 323 of the airfoil 316 as shown in FIG. 5. The cooling channel 330 is illustratively fed cooling air from the diffuser plenum 340, which is open to a source of cooling air at an end of the airfoil 316. The diffuser plenum 340 bleeds air at various locations thorough bleed holes 341 formed in the impingement plate 345 onto the metallic load shield 322.

A web-cooling plenum 350 is formed in the ceramic-containing web 320 as shown in FIG. 5. The web-cooling plenum 350 conducts cooling air through the web 320 and bleeds air at various locations thorough bleed holes 351 arranged along the pressure side 327 of the airfoil 316 to cool the ceramic web 320. The web-cooling plenum 350 is open to a source of cooling air at an end of the airfoil 316.

A supplemental plenum 360 is also formed in the ceramic-containing web 320 near the trailing edge of the ceramic-containing web 320 as shown in FIG. 5. The supplemental plenum 360 carries cooling air through the ceramic web 320 is open to a source of cooling air at an end of the airfoil 316.

In the illustrative embodiment, the ceramic-containing web 320 is a composite component adapted to withstand very high operating temperatures that might not be possible for metallic components. More specifically, the ceramic-containing web 320 comprises a ceramic matrix composite (CMC). Even more particularly, the ceramic-containing web 320 is made from a SiC—SiC ceramic matrix composite including a silicon carbide matrix and silicon carbide fibers. For purposes of this application, a ceramic-containing material is any monolithic ceramic or composite in which at least one constituent is a ceramic.

Illustratively, the ceramic web 320 includes woven plies of reinforcement that wrap from the trailing edge around the leading edge of the web. The woven plies are then suspended in a matrix material and processed into the final shape of the ceramic web 320. The plenums 350, 360 are formed by the creation of gaps between the woven plies. In other embodiments, the woven plies of reinforcement may be tubes without any seam. In still other embodiments, the ceramic web 320 may be made from chopped reinforcing fibers suspended in a matrix or from a monolithic ceramic.

In the illustrative embodiment, the metallic load shield 322 forms the trailing edge 323 of the airfoil 316 as shown in FIG. 5. The load shield 322 is formed to include a plurality of discharge holes 380 that provide fluid communication out of the cooling channel 330 along the trailing edge 323 of the airfoil 316. In other embodiments, the load shield 322 may be formed to include a trench or other apertures that provide fluid communication out of the cooling channel 330 near the trailing edge 323 of the airfoil 316.

The exemplary metallic load shield 322 and the impingement plate 345 each comprises a high-temperature resistant superalloy adapted to withstand high operating temperatures. More specifically, the metallic load shield 322 and plate 345 comprise a nickel-based or cobalt-based alloy. Specific examples of such superalloys include, but are not limited to, materials marketed under the trade names INCONEL® and WASPALOY®.

The cooled turbine vane 310 according to the illustrated example in this disclosure is comprised of a metallic structure 322 and a CMC body 320. The metallic structure 322 is principally responsible for reacting the mechanical loads imparted by the gas path air while the CMC body 320 comprises either the pressure side of the airfoil feature for the purpose of reducing the amount of cooling required to provide adequate durability.

The exemplary design provides a hybrid vane that employs the CMC material to form one side of an otherwise fully metallic turbine vane airfoil. For a turbine vane, the airfoil surface typically requires the largest amount of cooling air within the component. Thus, to replace some portion of an otherwise fully metallic airfoil with a high temperature capable ceramic material could significantly reduce the total amount of cooling air required to meet component durability at higher inlet turbine gas temperatures. It would also be accurate to describe this concept as a CMC vane with a metallic load shield as the metallic skin is adapted to mitigate the load carrying limitations of the CMC material. This design may be used in high and moderate turbine operating temperature engine applications where at least one side of an otherwise fully metallic vane airfoil would require cooling.

The illustrative design features an integrally constructed or fabricated metallic structure comprising the inner and outer bands as well as the suction side of the airfoil 316. The CMC component 320 is principally constructed in a representatively classic airfoil shape with opposing sides and forms the pressure side of the airfoil 316, whereas the metal portion 322 of the airfoil 316 is constructed as a metallic skin. The metallic skin would be either rigidly bonded to or integrally formed with both the inner and outer endwall features to enable mechanical load transmission to the engine structure. Since the ultimate load carrying capability of CMCs may be low relative to metals, it may be desirable to employ constructions where the CMC component has a larger total cross sectional area whereas the metal component would be the thinner skin-like component.

While the metallic skin is rigidly attached to both the metallic inner and outer endwall features, the CMC component 320 may be constrained otherwise so as to allow the elongated airfoil to thermally grow independently of the metallic skin via sliding. It is conceived that the vane will be assembled by radially feeding the CMC body 320 into the metallic structure through either the outer or inner enwalls.

In order to be used in high temperature environments, this design includes a cooling scheme. It is conceived that the metallic skin 322 would embody an impingement cavity that would be vented at the trailing edge of the airfoil. In the attached graphic, cooling air is routed through a small dedicated cavity between the CMC body and the metallic impingement plate 345. Additional cooling features may be machined or cast into the metallic skin to aid in heat transfer. Cooling flows within the CMC body or through any wall of the CMC is optional and may be incorporated to supply pressure side film cooling and/or to manage stresses.

In the illustrated hybrid vane the CMC component 320 forms the pressure side of the airfoil 316 and the metallic skin 322 forms the suction side of the airfoil 316. It is conceived that cooling air will be fed through the dedicated cavity within the CMC wall in a balanced way so as to provide adequate mass flow for cooling but not overpressure the CMC body to the point of a ballooning-style failure. A metering plate may be employed to control mass-flows into the CMC body. A structural design requirement for the CMC body will be to withstand the pressure drop through-wall needed to drive impingement flows. It is conceived that this configuration will seek to pressurize CMC internal cavities to minimize pressure differentials across each CMC wall.

It is conceived that since there may be a seam at both the leading and trailing edges where the CMC and metallic skin meet, it is likely that external leakage areas will manifest as long, thin, span-wise openings at those locations. It also is conceived that the Leading Edge (LE) of the metallic skin should extend towards the PS of the hybrid airfoil at or beyond the stagnation point. As such leakages from the leading edge seam may create a film, biased towards mid-span, which might provide some heat shielding to the CMC PS.

It is conceived that the flow metering features would be the holes in the impingement plate 345. To reach the plate, cooling air must first pass through a cavity formed between the metallic structure and the CMC body. Thus, care may be required to manage leakages to avoid losing the cooling air before it has extracted heat from the metallic skin.

Due to the geometric complexity and the fact that the cooling cavities are created through an interface between materials with differing coefficients of thermal expansion, it is likely that interfaces will need to be somewhat optimized to control leakages at key operating conditions. This could either be at a maximum turbine operating temperature condition or another condition where the engine might operate for a large portion of its duty cycle.

It is conceived that that the air pressure within the cooling cavity will create a force that seeks to separate the CMC from metallic skin. Therefore, there may be a seam at both the leading and trailing edges, where the CMC and metallic skin meet, that will create elongated and span-wise leakage areas. Such leakages from the leading edge seam may create a film, biased towards mid-span, which might prove useful.

Though the attached figures depicts a curved interface between the CMC 320 and the metallic skin 322, there is no absolute need for such a sophisticated interface. It could be more planar (or multi-planar) and otherwise simplistic in whatever fashion best balances produce-ability with cooling needs.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine vane for use in a gas turbine engine, the turbine vane comprising
   an inner platform,
   an outer platform spaced from the inner platform, and
   an airfoil that extends from the inner platform to the outer platform, the airfoil including a ceramic-containing web that forms a pressure side of the airfoil and a metallic load shield that forms a suction side of the airfoil and extends from a leading edge of the airfoil to a trailing edge of the airfoil,
   wherein a cooling channel is formed between the ceramic-containing web and the metallic load shield that extends from a mid-span region of the airfoil toward the trailing edge of the airfoil.

2. The turbine vane of claim 1, wherein the ceramic-containing web is formed to include a first plenum that extends across at least a portion of the distance from the inner platform to the outer platform and the first plenum is in fluid communication with the cooling channel to provide a pathway for cooling air in the first plenum to be conducted to the cooling channel during use of the turbine vane in the gas turbine engine.

3. The turbine vane of claim 2, wherein the ceramic-containing web is formed to include a plurality of shield-cooling holes that provide the fluid communication between the first plenum and the cooling channel.

4. The turbine vane of claim 2, wherein the ceramic-containing web is formed to include a second plenum that extends across at least a portion of the distance from the inner platform to the outer platform and the second plenum is spaced apart from the first plenum.

5. The turbine vane of claim 4, wherein the ceramic-containing web is formed to include a plurality of shield-cooling holes that provide fluid communication between the second plenum and the cooling channel.

6. The turbine vane of claim 4, wherein the ceramic-containing web is formed to include a plurality of web-cooling holes that provides fluid communication out of the second plenum along the pressure side of the airfoil.

7. The turbine vane of claim 4, wherein the ceramic-containing web is formed to include at least one transfer aperture that provides fluid communication between the first plenum and the second plenum.

8. The turbine vane of claim 7, wherein the ceramic-containing web is formed to include a plurality of web-cooling holes that provides fluid communication out of the second plenum along the pressure side of the airfoil.

9. The turbine vane of claim 4, further comprising a restrictor plate arranged at an end of the first plenum and the second plenum, the restrictor plate formed to include a first restriction port in fluid communication with the first plenum and sized to cause a first pressure to be established within the first plenum by cooling air supplied to the first plenum that passes through the first restriction port, and the restrictor plate formed to include a second restriction port in fluid communication with the second plenum and sized to cause a second pressure to be established within the second plenum by cooling air supplied to the second plenum that passes through the second restriction port.

10. The turbine vane of claim 1, wherein the metallic load shield is formed to include a plurality of discharge holes that provide fluid communication out of the cooling channel along the trailing edge of the airfoil.

11. A turbine vane for use in a gas turbine engine, the turbine vane comprising
    an inner platform,
    an outer platform spaced from the inner platform, and
    an airfoil that extends from the inner platform to the outer platform, the airfoil including a ceramic-containing web that forms a pressure side of the airfoil and a metallic load shield that forms a suction side of the airfoil and extends from a leading edge of the airfoil to a trailing edge of the airfoil,
    wherein the ceramic-containing web is formed to include a first plenum that extends at least a portion of the distance from the inner platform to the outer platform and the metallic load shield forms a plurality of discharge holes along the trailing edge of the airfoil in fluid communication with the first plenum to allow egress of cooling air in the plenum along the trailing edge of the airfoil.

12. The turbine vane of claim 11, wherein a cooling channel is formed between the ceramic-containing web and the metallic load shield that provides fluid communication between the first plenum and the plurality of discharge holes.

13. The turbine vane of claim 12, wherein the ceramic-containing web is formed to include a plurality of shield-cooling holes arranged to direct cooling air in the first plenum toward the metallic load shield and to provide fluid communication between the first plenum and the cooling channel.

14. The turbine vane of claim 12, wherein the ceramic-containing web is formed to include a second plenum spaced apart from the first plenum.

15. The turbine vane of claim 14, wherein the ceramic-containing web is formed to include a plurality of web-cooling holes that provide fluid communication out of the second plenum along the pressure side of the airfoil.

16. The turbine vane of claim 15, wherein the ceramic-containing web is formed to include at least one transfer aperture that provides fluid communication between the first plenum and the second plenum.

17. The turbine vane of claim 15, wherein the ceramic-containing web is formed to include a third plenum spaced apart from the first plenum and in fluid communication with the cooling channel.

* * * * *